United States Patent [19]
Solow

[11] Patent Number: 6,002,324
[45] Date of Patent: Dec. 14, 1999

[54] UNIVERSAL REPLACEMENT HORN

[75] Inventor: Joseph E. Solow, Dix Hills, N.Y.

[73] Assignee: WOLO Manufacturing Corporation, Deer Park, N.Y.

[21] Appl. No.: 09/018,148

[22] Filed: Feb. 3, 1998

[51] Int. Cl.⁶ .................................................. H01H 9/00
[52] U.S. Cl. ..................... 340/384.1; 340/391.1; 116/137 R
[58] Field of Search ............... 340/384.1, 388.1, 340/391.1; 116/137 R

[56] References Cited

U.S. PATENT DOCUMENTS

| | | | |
|---|---|---|---|
| 4,516,001 | 5/1985 | West | 200/61.54 |
| 5,721,409 | 2/1998 | Enders | 200/61.54 |
| 5,789,827 | 8/1998 | Rowley et al | 307/9.1 |

*Primary Examiner*—Edward Lefkowitz
*Attorney, Agent, or Firm*—Baker & Botts, LLP

[57] ABSTRACT

A universal replacement automobile horn includes a horn body with a mounting bolt and first and second electrical terminal blades for providing electrical signals to a horn mechanism. The blades are electrically isolated from the mounting boot. A connected wire is provided and has a first end connector for engaging one of the blades and a second end connector which is connectable to the mounting bolt. One or more protective boots may be provided for enclosing the horn connecting wire and the electrical terminal blade.

8 Claims, 2 Drawing Sheets

UNIVERSAL REPLACEMENT HORN

BACKGROUND OF THE INVENTION

The present invention relates to replacement automobile horns, and particularly to universal replacement horns.

The current market for replacement automobile horns includes models which are designed to accommodate either a one wire connection in the automobile or a two-wire connection.

Automobile owners who need to replace their vehicle horn frequently choose the wrong horn model, and after attempting to install the replacement horn, realize they require a different model and return the horn to the retail store. The retailer must then return the horn to the manufacturer or distributor to have the packaging replaced. Accordingly suppliers for replacement horns have experienced a high volume of retail dealer returns.

It is an object of the invention to provide a universal replacement horn that can be used on vehicles having one wire or two wire horn connections.

SUMMARY OF THE INVENTION

In accordance with the invention there is provided a universal replacement automobile horn which includes a horn body provided with a conductive portion arranged to be grounded to the automobile when the horn is mounted and having first and second blade terminals for providing electrical signals to operate a horn mechanism. A removable connecting member is provided for electrically interconnecting one of the blade terminals and the conductive portion of the body. In a preferred embodiment there is provided a protective boot for enclosing one or both of the blade terminals.

In accordance with the invention there is also provided a method for installing a horn having first and second wire terminals and a conductive mounting member in a vehicle having a single horn wire. According to the method the single horn wire is connected to one of the horn wire terminals and the other horn wire terminal is electrically connected to the conductive mounting member. The horn is mounted by the conductive mounting member to a conductive vehicle member to complete a ground connection.

For a better understanding of the present invention, together with other and further objects, reference is made to the following description, taken in conjunction with the accompanying drawings, and its scope will be pointed out in the appended claims.

PREFERRED DESCRIPTION OF THE DRAWINGS

DESCRIPTION OF THE PREFERRED EMBODIMENT

Figure 1:
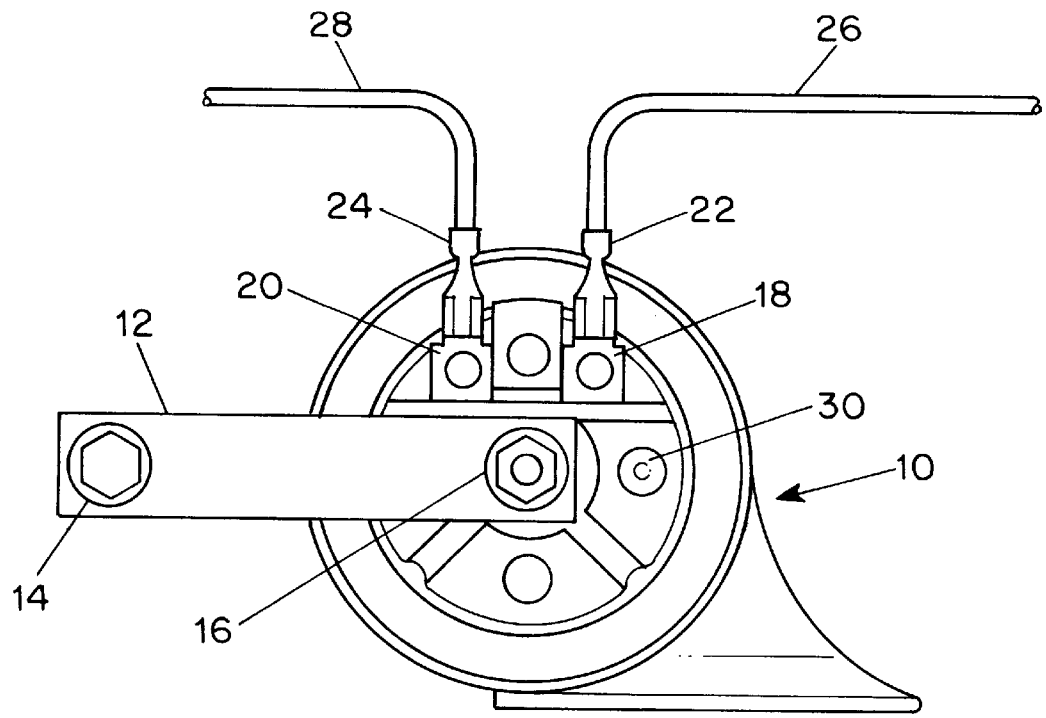
FIG. 1 illustrates a two wire horn installation in accordance with the prior art.

FIG. 1 illustrates a prior art two-wire replacement horn 10. The horn is arranged to be connected to a horn relay or switch by wires 26 and 28, one of which provides battery voltage for activation of the horn and the other of which provides a current return. Wires 26 and 28 are connected to blade terminals 18 and 20 by mating wire connectors 22 and 24. The horn 10 includes a conductive body portion 30, which is in electrical contact with a mounting bolt 16. Bolt 16 may be directly mounted on the vehicle body member or, using a mounting bracket 12, be connected by bolt 14 to a body member. The FIG. 1 horn is not arranged for mounting in a vehicle with a single horn wire, wherein the current return is provided by mounting the horn to a conductive body member of the vehicle, because conductive portion 30 and mounting bolt 16 are not connected to the horn mechanism. Installation in such vehicles has previously required the use a single terminal horn, wherein the mounting bolt, corresponding to bolt 16, is connected as a return electrical path to the vehicle horn mechanism.

Figure 2:
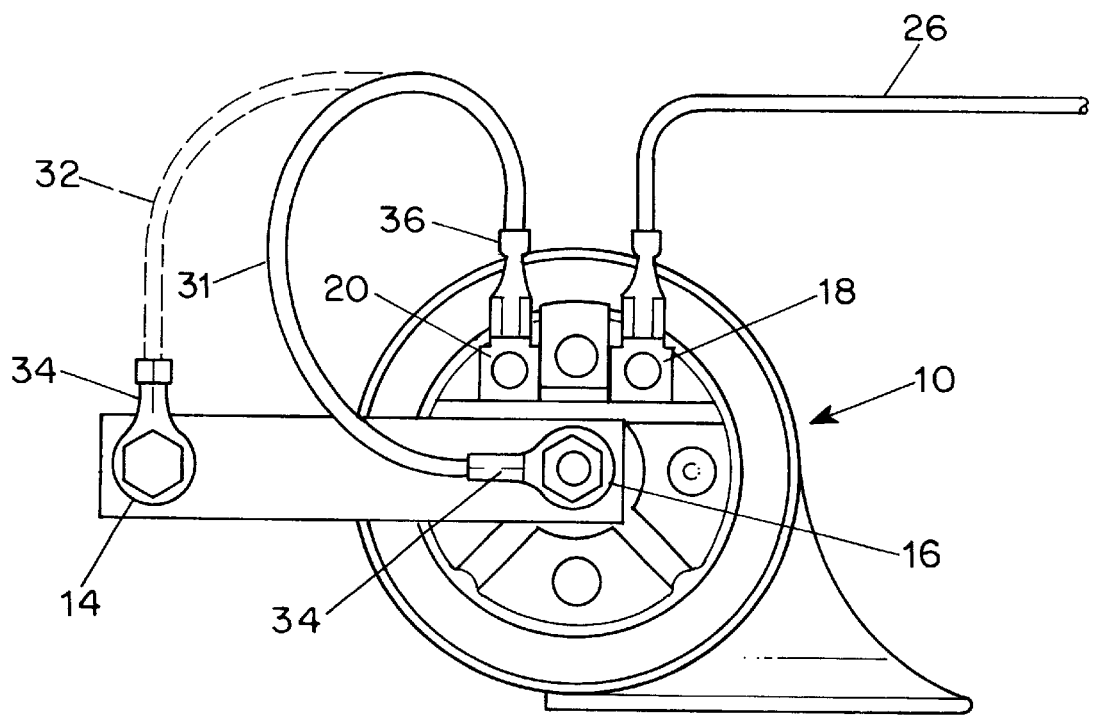
FIG. 2 illustrates a horn in accordance with the present invention.

FIG. 2 illustrates an arrangement in accordance with the present invention, wherein a two wire horn is installed in a vehicle equipped with a single wire horn connection. Wire 26, which is connected to the horn relay is connected to one of the terminal blades 18 of horn 10. The horn is provided with a removable jumper wire 31 having a connector 36 at one end for connection to the other blade terminal of horn 10, and a ring connector 34 at the other end, which can be connected to mounting bolt 16 thereby to ground blade terminal 20. Wire 31 has a length which allows convenient connection to bolt 16 as illustrated in FIG. 2, or connection to bolt 14 as shown by dotted line 32 in FIG. 2.

Using the arrangement of FIG. 2 the two terminal horn 10 is easily installed by an unskilled person in a vehicle arranged for single wire horn connection.

Figure 3:
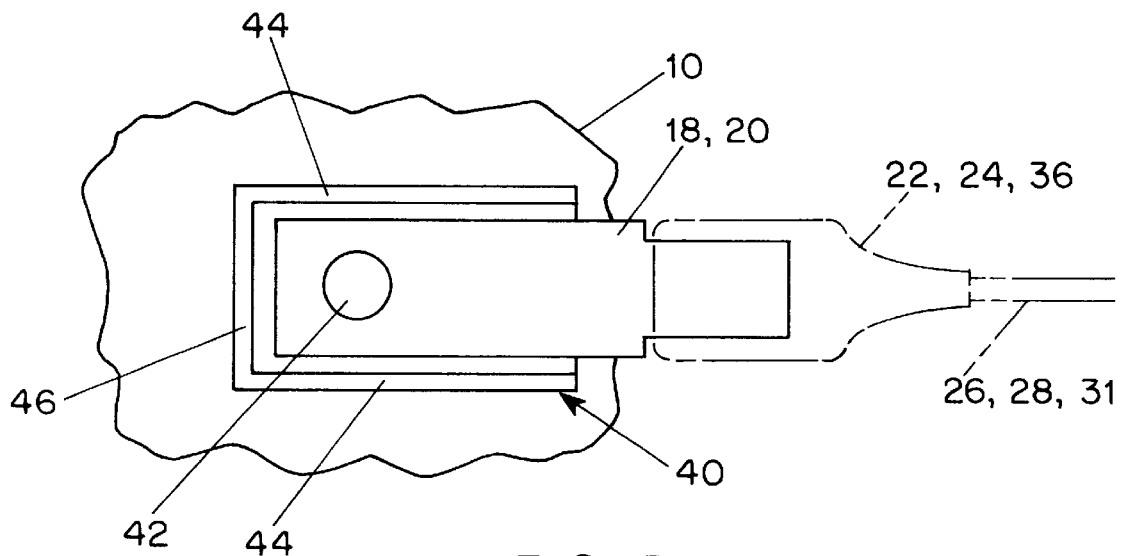
FIG. 3 is a drawing showing a portion of the FIG. 2 horn.
Figure 4:
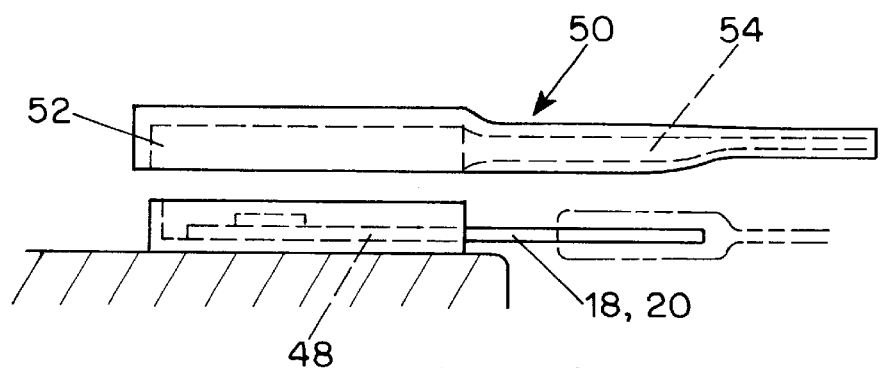
FIG. 4 is a side view of the horn portion shown in FIG. 3, further showing a protective boot.

FIG. 3 is detailed view of one of the blade connectors 18, 20 showing in phantom the connection of a wire thereto using mating wire connector 22, 24, 36. Terminal blade 18 is mounted on a nonconductive member 40 which includes side walls 44 a back wall 46 and a base plate 48 (shown in FIG. 4) to isolate terminal blade 18 from the housing. A rivet 42 holds blade 18 in place and provides electrical connection to the horn mechanism within the housing.

Figure 5:
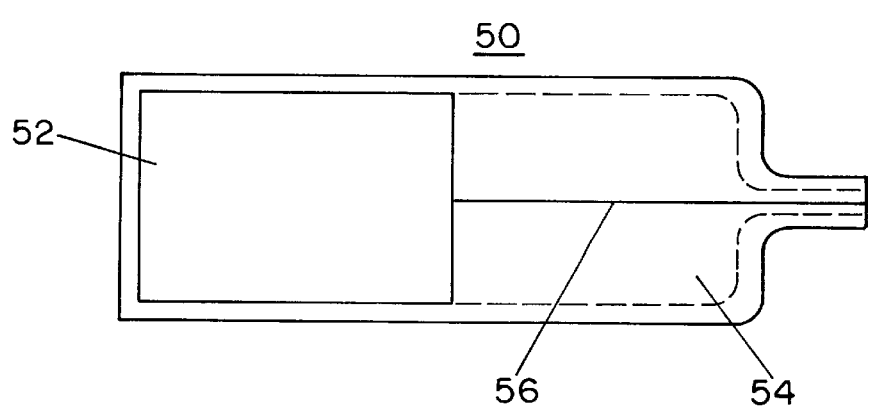
FIG. 5 is a bottom view of the protective boot shown in FIG. 4.

The inventor has discovered that the intrusion of moisture into the horn housing along rivet 42 is a frequent cause of horn failure. In accordance with one aspect of the invention there is provided a protective insulating boot 50, shown in cross-section view in FIG. 4 and bottom view in FIG. 5 which provides a protective cover for blade 18 and connector 22 against moisture which may result from driving in wet weather conditions. Boot 50 includes an interior space 52 into which member 40 can be received. Space 52 is connected to an interior extension 54 which is sized and arranged to fully enclose connector 22 and partially enclose wire 26. A slot 56 in the lower side of boot 50 enables the boot to be applied around the wire and connector 22.

While there has been described what is believed to be the preferred embodiment of the present invention, those skilled in the art will recognize that other and further changes may be made thereto without departing from the spirit of the present invention, and it is intended to claim all such changes and modifications as fall within the true scope of the invention.

I claim:

1. A universal replacement automobile horn comprising a horn body having a mounting bolt and first and second electrical terminal blades for providing electrical signals to a horn mechanism, said blades being electrically isolated from said mounting bolt, and a connecting wire having a first end connector for engaging one of said blades and a second end connector for engaging said mounting bolt.

2. A horn as specified in claim 1 wherein said connecting wire further includes a protective boot for enclosing one of said electrical terminal blades.

3. A horn as specified in claim 2 wherein said horn further includes at least one protective boot for surrounding a horn connecting wire and enclosing one of said electrical terminal blades.

4. A universal replacement automobile horn comprising a horn body having a conductive portion arranged to be grounded to an automobile when said horn is mounted and having first and second blade terminals for providing electrical signals to a horn mechanism, and a removable connecting member for electrically interconnecting one of said blade terminals and said conductive portion of said horn body.

5. A horn as specified in claim 4 wherein said removable connecting member further includes a protective boot for enclosing said one blade connector.

6. A horn as specified in claim 5 wherein said horn further includes at least one protective boot for surrounding a horn connecting wire and enclosing the other of said electrical terminal blades.

7. A method for installing a horn, having first and second horn wire terminals and a conductive mounting member, in a vehicle having a single horn wire, comprising connecting said single horn wire to one of said horn wire terminals, connecting the other of said horn wire terminals to said conductive mounting member and mounting said horn by said conductive mounting member to a conductive vehicle member to complete a ground connection.

8. A method as specified in claim 7 further comprising enclosing at least one of said horn wire terminals in a protective boot.

* * * * *